United States Patent
Miwa et al.

(10) Patent No.: US 10,533,859 B2
(45) Date of Patent: Jan. 14, 2020

(54) MAP UPDATE SYSTEM, NAVIGATION DEVICE, SERVER DEVICE, MAP UPDATE METHOD, NAVIGATION METHOD, SERVER DEVICE CONTROL METHOD, AND TANGIBLE NON-TRANSITORY COMPUTER-READABLE STORAGE MEDIUM CONTAINING COMPUTER PROGRAM

(71) Applicants: TOYOTA MAPMASTER INCORPORATED, Nagoya-shi, Aichi (JP); MICWARE CO., LTD., Kobe-shi, Hyogo (JP)

(72) Inventors: Takahiro Miwa, Nagoya (JP); Ayumu Shingu, Kobe (JP)

(73) Assignee: TOYOTA MAPMASTER INCORPORATED (JP)

( * ) Notice: Subject to any disclaimer, the term of this patent is extended or adjusted under 35 U.S.C. 154(b) by 97 days.

(21) Appl. No.: 15/521,482

(22) PCT Filed: Oct. 6, 2015

(86) PCT No.: PCT/JP2015/078281
§ 371 (c)(1),
(2) Date: Apr. 24, 2017

(87) PCT Pub. No.: WO2016/067849
PCT Pub. Date: May 6, 2016

(65) Prior Publication Data
US 2017/0314932 A1   Nov. 2, 2017

(30) Foreign Application Priority Data
Oct. 29, 2014 (JP) .................................. 2014-220600

(51) Int. Cl.
*G08G 1/123* (2006.01)
*G01C 21/26* (2006.01)
(Continued)

(52) U.S. Cl.
CPC ......... *G01C 21/26* (2013.01); *G06F 16/2358* (2019.01); *G06F 16/2379* (2019.01); *G06F 16/29* (2019.01)

(58) Field of Classification Search
CPC ... G01C 21/26; G01C 21/32; G06F 17/30241; G06F 17/30377; G06F 17/30368; G06F 17/30; G06F 7/06; G09B 29/003
(Continued)

(56) References Cited

U.S. PATENT DOCUMENTS

2013/0013557 A1* 1/2013 Kunath .................. G01C 21/26
                                                        707/609

FOREIGN PATENT DOCUMENTS

JP       200470323 A      3/2004
JP       2004347988 A    12/2004
(Continued)

OTHER PUBLICATIONS

English Translation for JP2005235087A.*
(Continued)

*Primary Examiner* — Mahmoud S Ismail
(74) *Attorney, Agent, or Firm* — Schmeiser, Olsen & Watts, LLP

(57) ABSTRACT

A map update system, a navigation device, and a server device is provided. The map update system updates map data of the navigation device based on map data stored by the server device, the map data includes section data corresponding to each section of a navigation map divided into multiple sections and management data designating the section data to be referenced when rendering, the server device receives generation information from the navigation device of map data being currently referenced by the navigation device and creates difference data between map data of a generation corresponding to the received generation
(Continued)

information and map data of a newest generation, the navigation device creates updated management data and updated section data by updating management data and section data corresponding to the difference data and writes respectively updated data on different areas that are different from areas on which respective pre-update data area stored.

12 Claims, 7 Drawing Sheets

(51) Int. Cl.
  *G06F 16/29*  (2019.01)
  *G06F 16/23*  (2019.01)
  *G06F 7/00*   (2006.01)
  *G06F 17/00*  (2019.01)
(58) Field of Classification Search
  USPC .......................................... 701/532; 707/609
  See application file for complete search history.

(56) References Cited

FOREIGN PATENT DOCUMENTS

| | | | |
|---|---|---|---|
| JP | 2005235087 | A * | 9/2005 |
| JP | 2005235087 | A | 9/2005 |
| JP | 2008249624 | A | 10/2008 |
| JP | 2012117906 | A | 6/2012 |
| JP | 2012181040 | A | 9/2012 |
| JP | 2012189448 | A | 10/2012 |
| WO | WO2010007689 | A1 | 1/2010 |
| WO | WO2010007690 | A1 | 1/2010 |

OTHER PUBLICATIONS

International Search Report; PCT/JP2015/078281; International Filing Date: Oct. 6, 2015; 2 Pgs.
Written Opinion; PCT/JP2015/078281; International Filing Date: Oct. 6, 2015; 6 Pgs.

* cited by examiner

FIG. 3
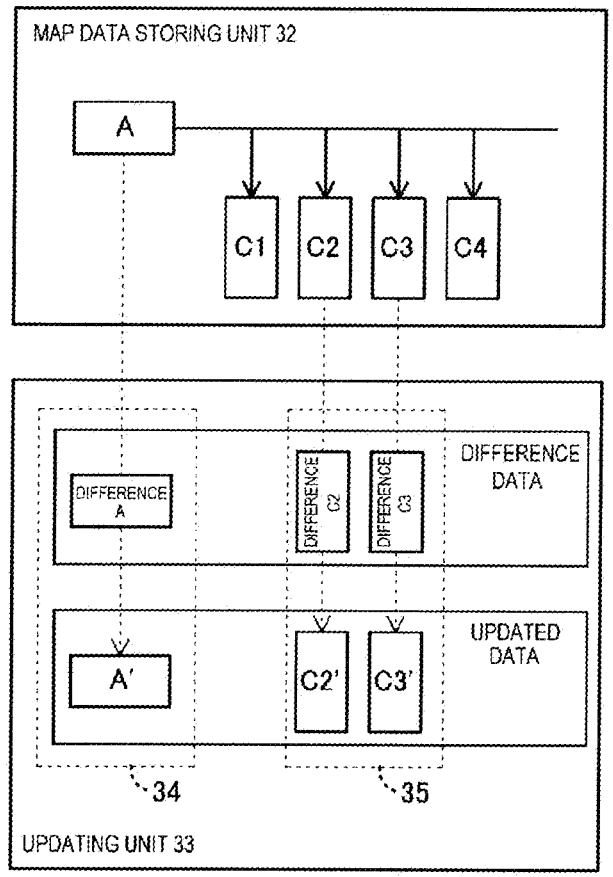
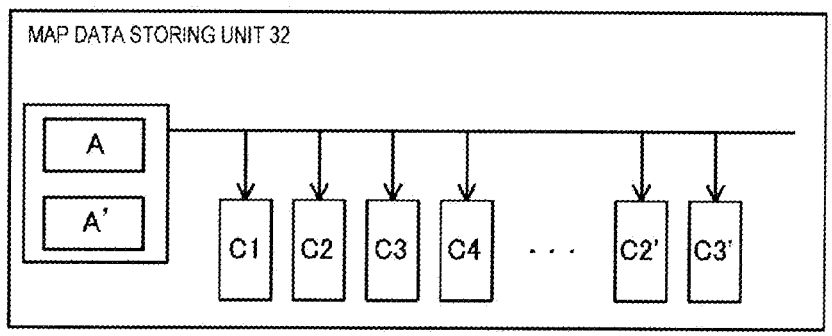

MAP UPDATE SYSTEM, NAVIGATION DEVICE, SERVER DEVICE, MAP UPDATE METHOD, NAVIGATION METHOD, SERVER DEVICE CONTROL METHOD, AND TANGIBLE NON-TRANSITORY COMPUTER-READABLE STORAGE MEDIUM CONTAINING COMPUTER PROGRAM

CROSS-REFERENCE TO RELATED APPLICATIONS

This application claims priority to PCT Application No. PCT/JP2015/078281, having a filing date of Oct. 6, 2015, based on JP 2014-220600, having a filing date of Oct. 29, 2014, the entire contents both of which are hereby incorporated by reference.

FIELD OF TECHNOLOGY

The following relates to a map update system, a navigation device, a server device, a map update method, a navigation method, a server device control method, a computer program, and a recording medium storing a computer program.

BACKGROUND

Various methods have been proposed for updating a map stored in a navigation device.

Current map update data creation devices may extract binary difference data based on mesh data of map data before and after update, detect mesh data and binary difference data corresponding to a map version recorded on a terminal device of a user, select, among these data, the data requiring lesser time to perform an update on the terminal device of the user, and output the selected data.

SUMMARY

An aspect relates to enabling continuous and stable display of a map in a navigation device.

Malfunctions occurring with updated map data have led to adverse situations in which, for example, a map cannot be displayed or the map data must be re-acquired such that continuous map display might be impaired.

Accordingly, embodiments of the present invention write updated map data to a different area that is different from an area on which map data before the update is stored so that, in the case of a malfunction occurring with the updated map data, the map data before the update may be referenced in order to continuously display a map.

In view of the above problems, a first aspect of the present invention is defined as follows. That is, a map update system having a server device storing map data for each generation and a navigation device configured to communicate with the server device, the map update system updating map data of the navigation device based on the map data stored by the server device, the map data comprising section data corresponding to each section for rendering a navigation map divided into a plurality of sections and management data for designating the section data to be referenced at a time of the rendering, the server device comprising:

a server device side receiving unit for receiving, from the navigation device, generation information of map data which is currently being referenced by the navigation device;

a difference data creating unit for creating difference data between map data of a generation corresponding to the received generation information and map data of a newest generation; and a server device side distributing unit for distributing the created difference data to the navigation device, the navigation device comprising:

a navigation device side receiving unit for receiving the difference data from the server device;

a management data updating unit for creating updated management data by updating the management data corresponding to the difference data based on the received difference data and writing the updated management data to a different area that is different from an area on which the management data before the update is stored; and a section data updating unit for creating updated section data by updating the section data corresponding to the difference data based on the received difference data and writing the updated section data to a different area that is different from an area on which the section data before the update is stored, wherein the updated management data designates the updated section data when rendering updated sections.

According to such a map update system as defined in the first aspect in which map data having section data and management data is updated, the server device creates and sends, to the navigation device, difference data between map data of the generation being currently referenced by the navigation device and map data of the newest generation, the navigation device, based on this difference data, updates corresponding management data and section data to create, respective updated management data and updated section data, both of which data being then written to a different area that is different from areas on which the management data before the update and the section data before the update are stored. Then, the updated management data designates updated section data when rendering updated sections.

By employing such a system, even when map data in the navigation device is updated to map data of a newest generation, this is stored in an area separate from the map data before the update and, in the case of a malfunction occurring with the map data of the newest generation, it is possible to use the map data before the update. Thus, even in the case of a malfunction occurring with updated map data, a map can be continuously displayed.

A second aspect of the present invention is defined as follows. That is, a navigation device having a map data storing unit for storing map data including section data corresponding to each section for rendering a navigation map divided into a plurality of sections and management data for designating the section data to be referenced at a time of the rendering, the map data being updated in the navigation device, comprising:

an input receiving unit for receiving input of difference data created by comparing new generation map data with old generation map data preceding the new generation map data;

a management data updating unit for creating updated management data by updating the management data corresponding to the difference data based on the received input of the difference data and writing the updated management data to a different area that is different from an area on which the management data before the update is stored;

and a section data updating unit for creating updated section data by updating the section data corresponding to the difference data based on the received input of the difference data and writing the updated section data to a different area that is different from an area on which the section data before the update is stored, wherein the updated management data designates the updated section data when rendering updated sections.

The effect of the navigation device as defined in the second aspect as described above is equivalent with that of the first aspect.

A third aspect of the present invention is defined as follows. That is, the navigation device according to the second aspect, wherein, in times subsequent to a first time, the different area is the area on which the section data before the update of the previous update is stored.

According to such a navigation device as defined in the third aspect, section data of the same section stored in the map data storing unit is always the updated section data and the section data before the update of the updated section data. Thus, storage space can be efficiently used and storage management is simplified.

A fourth aspect of the present invention is defined as follows. That is, the navigation device according to the second aspect, further comprising a write-area specifying unit for specifying an area within the map data storing unit, excluding areas on which the section data designated by the updated management data and the section data designated by the management data before the update are stored, as a writable area on which the updated section data can be written based on the updated management data and the management data before the update, wherein the section data updating unit writes the updated section data to an area specified by the write-area specifying unit as the different area.

According to such a navigation device as defined in the fourth aspect, in-advance specification of a writable area on which the updated section can be written enables processing load reductions, for example, of a CPU when writing updated section data.

A fifth aspect of the present invention is defined as follows. That is, a server device configured to communicate with the navigation device according to any one of the second to fourth aspects, which creates difference data which is provided to the navigation device based on a plurality of generations of map data stored in the server device comprising:

a difference data creating unit for creating the difference data between map data of adjacent generations for each generation;

a generation information receiving unit for receiving, from the navigation device, generation information of map data which is currently being referenced by the navigation device;

and a difference data specifying unit for specifying difference data required for updating map data of a generation corresponding to the received generation information to map data of a newest generation; and a distributing unit for distributing the specified difference data to the navigation device.

According to such a server device as defined in the fifth aspect, using the plurality of generations of map data stored therein, by creating difference data between map data of adjacent generations for each generation, when receiving, from the navigation device, generation information of map data currently being referenced by the navigation device, each of the difference data corresponding to generations from the received generation to the newest generation can be distributed. Preparing the difference data in advance obviates creating this difference data at the time of distribution, allowing for quick distribution processes.

A sixth aspect of the present invention is defined as follows. That is, a server device configured to communicate with the navigation device according to any one of the second to fourth aspects, which creates difference data which is provided to the navigation device based on a plurality of generations of map data stored in the server device comprising:

a generation information receiving unit for receiving, from the navigation device, generation information of map data which is currently being referenced by the navigation device; and a difference data creating unit for creating the difference data between map data of a generation corresponding to the received generation information and map data of a newest generation.

According to such a server device as defined in the sixth aspect, using map data of a plurality of generations stored therein, when the generation information of the map data currently being referenced by the navigation is received from the navigation device, a difference data between map data of a generation corresponding to the received generation information and map data of a newest generation is created and this created difference data is distributed. Creating difference data between the newest generation and the generation according to the generation information of the map data currently being referenced by the navigation device facilitates distribution processing.

A seventh aspect of the present invention is defined as follows. That is, the server device according to the sixth aspect, further comprising:

a notification signal receiving unit for receiving a notification signal indicating that the map data is not functioning normally in the navigation device;

and a generation information requesting unit for making a request for the generation information when receiving the notification signal, wherein the generation information receiving unit receives the generation information corresponding to the request.

According to such a server device as defined in the seventh aspect, only when map data is not functioning normally in the navigation device, the server device creates difference data between the newest generation and the generation according to the generation information of the map data not functioning normally, which need only be distributed, thus reducing redundant processing.

An eighth aspect of the present invention is defined as follows. That is, a navigation method which updates map data in a navigation device including a map data storing unit for storing map data including section data corresponding to each section for rendering a navigation map divided into a plurality of sections and management data for designating the section data to be referenced at a time of the rendering comprising:

an input receiving step of receiving, by an input receiving unit, input of difference data created by comparing new generation map data with old generation map data preceding the new generation map data;

a management data updating step of creating, by a management data updating unit, updated management data by updating the management data corresponding to the difference data based on the received input of the difference data and writing the updated management data to a different area that is different from an area on which the management data before the update is stored; and a section data updating step of creating, by a section data updating unit, updated section data by updating the section data corresponding to the difference data based on the received input of the difference data and writing the updated section data to a different area that is different from an area on which the section data before the update is stored, wherein the updated management data designates the updated section data when rendering updated sections.

The effect of the eighth aspect of the present invention as defined above is equivalent with that of the second aspect.

A ninth aspect of the present invention is defined as follows. That is, the navigation method according to the eight aspect, wherein, in times subsequent to a first time, the different area is an area on which the section data before the update of the previous update is stored.

The effect of the ninth aspect of the present invention as defined above is equivalent with that of the third aspect.

A tenth aspect of the present invention is defined as follows. That is, the navigation method according to the eight aspect, further comprising a write-area specifying step of specifying, by a write-area specifying unit, an area within the map data storing unit, excluding areas on which the section data designated by the updated management data and the section data designated by the management data before the update are stored, as a writable area on which the updated section data can be written based on the updated management data and the management data before the update, wherein the updated section data is written in the section data updating step on an area specified in the write-area specifying step as the different area.

The effect of the tenth aspect of the present invention as defined above is equivalent with that of the fourth aspect.

An eleventh aspect of the present invention is defined as follows. That is, a server device control method using a server device configured to communicate with the navigation device according to any one of the second to fourth aspects, which creates difference data which is provided to the navigation device based on a plurality of generations of map data stored in the server device comprising:

a difference data creating step of creating, by a difference data creating unit, the difference data between map data of adjacent generations for each generation;

a generation information receiving step of receiving, by a generation information receiving unit, from the navigation device, generation information of map data which is currently being referenced by the navigation device; and a difference data specifying step of specifying, by a difference data specifying unit, difference data required for updating map data of a generation corresponding to the received generation information to map data of a newest generation; and a distributing step of distributing, by a distributing unit, the specified difference data to the navigation device.

The effect of the eleventh aspect of the present invention as defined above is equivalent with that of the fifth aspect.

A twelfth aspect of the present invention is defined as follows. That is, a server device control method using a server device configured to communicate with the navigation device according to any one of the second to fourth aspects, which creates difference data which is provided to the navigation device based on a plurality of generations of map data stored in the server device comprising:

a generation information receiving step of receiving, by a generation information receiving unit, from the navigation device, generation information of map data which is currently being referenced by the navigation device;

and a difference data creating step of creating, by a difference data creating unit, the difference data between map data of a generation corresponding to the received generation information and map data of a newest generation.

The effect of the twelfth aspect of the present invention as defined above is equivalent with that of the sixth aspect.

A thirteenth aspect of the present invention is defined as follows. That is, the server device control method according to the twelfth aspect, further comprising: a notification signal receiving step of receiving, by a notification signal receiving unit, a notification signal indicating that the map data is not functioning normally in the navigation device;

and a generation information requesting step of making, by a generation information requesting unit, a request for the generation information when receiving the notification signal, wherein the generation information corresponding to the request is received in the generation information requesting step.

The effect of the thirteenth aspect of the present invention as defined above is equivalent with that of the seventh aspect.

Furthermore, a fourteenth aspect of the present invention is defined as follows. That is, a computer program, including a map data storing unit for storing map data including section data corresponding to each section for rendering a navigation map divided into a plurality of sections and management data for designating the section data to be referenced at a time of rendering, for updating the map data, configured to cause a computer to function as:

input receiving means for receiving input of difference data created by comparing new generation map data with old generation map data preceding the new generation map data;

management data updating means for creating updated management data by updating the management data corresponding to the difference data based on the received input of the difference data and writing the updated management data to a different area that is different from an area on which the management data before the update is stored; and section data updating means for creating updated section data by updating the section data corresponding to the difference data based on the received input of the difference data and writing the updated section data to a different area that is different from an area on which the section data before the update is stored, wherein the updated management data designates the updated section data when rendering updated sections.

The effect of the fourteenth aspect of the present invention as defined above is equivalent with that of the second aspect.

A fifteenth aspect of the present invention is defined as follows. That is, the computer program according to the fourteenth aspect, wherein, in times subsequent to a first time, the different area is the area on which the section data before the update of the previous update is stored.

The effect of the fifteenth aspect of the present invention as defined above is equivalent with that of the third aspect.

A sixteenth aspect of the present invention is defined as follows. That is, the computer program according the fourteenth aspect, further configured to cause the computer to function as write-area specifying means for specifying an area within the map data storing unit, excluding areas on which the section data designated by the updated management data and the section data designated by the management data before update are stored, as a writeable area on which the updated section data can be written based on the updated management data and the management data before update, wherein the updated section data is written with the section data updating means on an area specified in the write-area specifying step as the different area.

The effect of the sixteenth aspect of the present invention as defined above is equivalent with that of the fourth aspect.

A seventeenth aspect of the present invention is defined as follows. That is, a computer program, using a server device configured to communicate with the navigation device according to any one of claims 2 to 4, for creating difference data which is provided to the navigation device based on a plurality of generations of the map data stored in the server device, configured to cause a computer to function as:

a difference data creating means for creating the difference data between map data of adjacent generations for each generation;

generation information receiving means for receiving, from the navigation device, generation information of map data which is currently being referenced by the navigation device; and difference data specifying means for specifying difference data required for updating map data of a generation corresponding to the received generation information to map data of a newest generation; and distributing means for distributing the specified difference data to the navigation device.

The effect of the seventeenth aspect of the present invention as defined above is equivalent with that of the fifth aspect.

An eighteenth aspect of the present invention is defined as follows. That is, a computer program using a server device configured to communicate with the navigation device according to any one of the second to fourth aspects, which creates difference data which is provided to the navigation device based on a plurality of generations of the map data stored in the server device, configured to cause a computer to function as:

generation information receiving means for receiving, from the navigation device, generation information of map data which is currently being referenced by the navigation device; and difference data creating means for creating the difference data between map data of a generation corresponding to the received generation information and map data of a newest generation.

The effect of the eighteenth aspect of the present invention as defined above is equivalent with that of the sixth aspect.

A nineteenth aspect of the present invention is defined as follows. That is, the computer program according the eighteenth aspect, further configured to cause the computer to function as:

notification signal receiving means for receiving a notification signal indicating that the map data is not functioning normally in the navigation device; and generation information requesting means for making a request for the generation information when receiving the notification signal, wherein the generation information corresponding to the request is received with the generation information requesting means.

The effect of the nineteenth aspect of the present invention as defined above is equivalent with that of the seventh aspect.

A twentieth aspect is defined as a recording medium on which the computer program according to any one of the fourteenth to nineteenth aspects is recorded.

A twenty-first aspect of the present invention is defined as follows. That is, a map update method, with a server device storing map data for each generation and a navigation device configured to communicate with the server device, for updating map data of the navigation device based on the map data stored by the server device, the map data comprising section data corresponding to each section for rendering a navigation map divided into a plurality of sections and management data for designating the section data to be referenced at a time of the rendering, comprising:

a server device side receiving step of receiving, by a server device side receiving unit, from the navigation device, generation information of map data which is currently being referenced by the navigation device;

a difference data creating step of creating, by a difference data creating unit, difference data between map data of a generation corresponding to the received generation information and a map data of a newest generation;

a server device side distributing step of distributing, by a server device side distributing unit, the created difference data to the navigation device;

a navigation device side receiving step of receiving, by a navigation device side receiving unit, the difference data from the server device;

a management data updating step of creating, by a management data updating unit, updated management data by updating the management data corresponding to the difference data and writing the updated management data to a different area that is different from an area on which the management data before the update is stored; and a section data updating step of creating, by a section data updating unit, updated section data by updating the section data corresponding to the difference data based on the received difference data and writing the updated section data to a different area that is different from an area on which the section data before the update is stored, wherein the updated management data designates the updated section data when rendering updated sections.

The effect of the twenty first aspect of the present invention as defined above is equivalent with that of the first aspect.

BRIEF DESCRIPTION

Some of the embodiments will be described in detail, with reference to the following figures, wherein like designations denote like members, wherein:

FIG. 3 is a schematic diagram for explaining a processing executed in an updating unit, in accordance with embodiments of the present invention;

DETAILED DESCRIPTION

A map update system according to an embodiment of the present invention will now be described.

Figure 1:
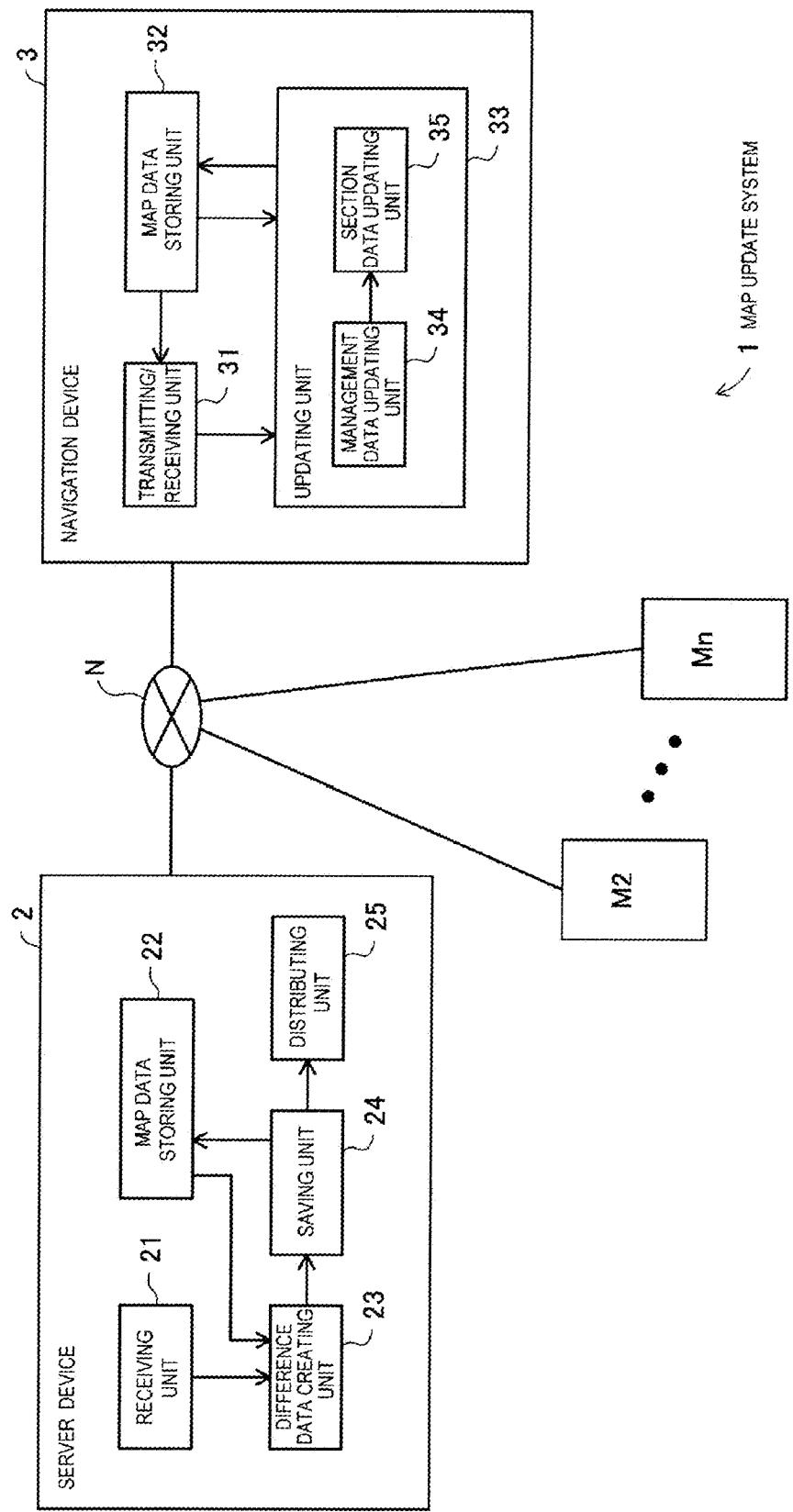
FIG. 1 is a block diagram illustrating a configuration of a map update system, in accordance with embodiments of the present invention.

FIG. 1 illustrates a schematic configuration of a map update system 1.

As illustrated in FIG. 1, the map update system 1 includes a server device 2 and a first navigation device 3, and also includes 2nd to nth navigation device (M2 to Mn); the server device 2 and each navigation device are each wirelessly connected via the Internet N.

The first navigation device 3 is a user-portable communication-terminal device which may be, for example, a mobile phone, a PDA (portable digital assistant), a portable game machine, a laptop PC, a PND (portable navigation device), a smartphone, or a wearable device that can be worn on the head or arm, among others.

The server device 2 includes a receiving unit 21, a server-side map data storing unit 22, a difference data creating unit 23, a saving unit 24, and a distributing unit 25.

The server-side receiving unit 21 receives, via a transmitting/receiving unit 31 of the navigation device 3 described below, generation information of map data currently being referenced by the navigation device 3.

Figure 2A:
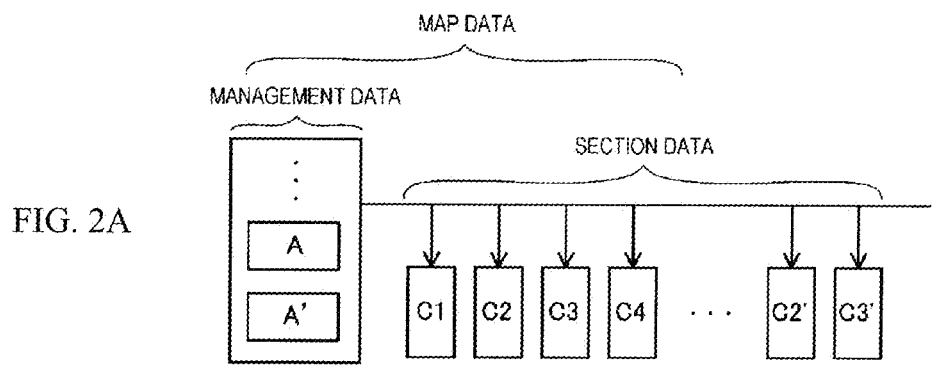
FIG. 2A is a schematic diagram explaining a map data structure stored in a server-side map data storing unit, in accordance with embodiments of the present invention.
Figure 2B:
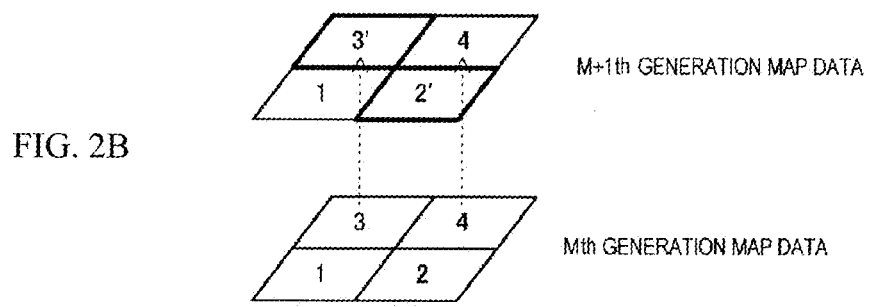
FIG. 2B is a schematic diagram explaining section data designated by management data before and after an update, in accordance with embodiments of the present invention.

The server-side map data storing unit 22 stores map data for each generation. The map data includes section data corresponding to each section for rendering a navigation map divided into a plurality of sections and management data for designating the section data to be referenced at a time of rendering. FIG. 2A illustrates one example of a map data structure stored in the server-side map data storing unit 22. As illustrated in FIG. 2A, the map data includes management data and section data. In this example, management data ( . . . A, A') of each generation is stored in a management data area. Furthermore, in another area of the storing unit 22, section data (C1, C2, C3, C4, . . . , C2', C3') of each generation is stored. The section data can be, for example, data obtained by dividing map data of an entire country into a mesh pattern at regular distance intervals. The management data designates section data for displaying each mesh when displaying the map. For example, as illustrated in FIG. 2B, among section data 1 to 4 constituting an mth generation map, in the case of an m+1th generation map in which sections 2' and 3' are updated, management data A designated section data C1 to C4 for reference in the mth generation map data, and management data A' which is updated (updated management data A') now designates section data C1, C4 and updated section data C2', C3' for reference in the m+1th generation map data. In the map data storing unit 22, for the map data of each generation, difference data between adjacent generations may be stored in association with the map data of each corresponding generation; furthermore, the difference data for each generation may be compressed and stored as compressed data.

Figure 2C:
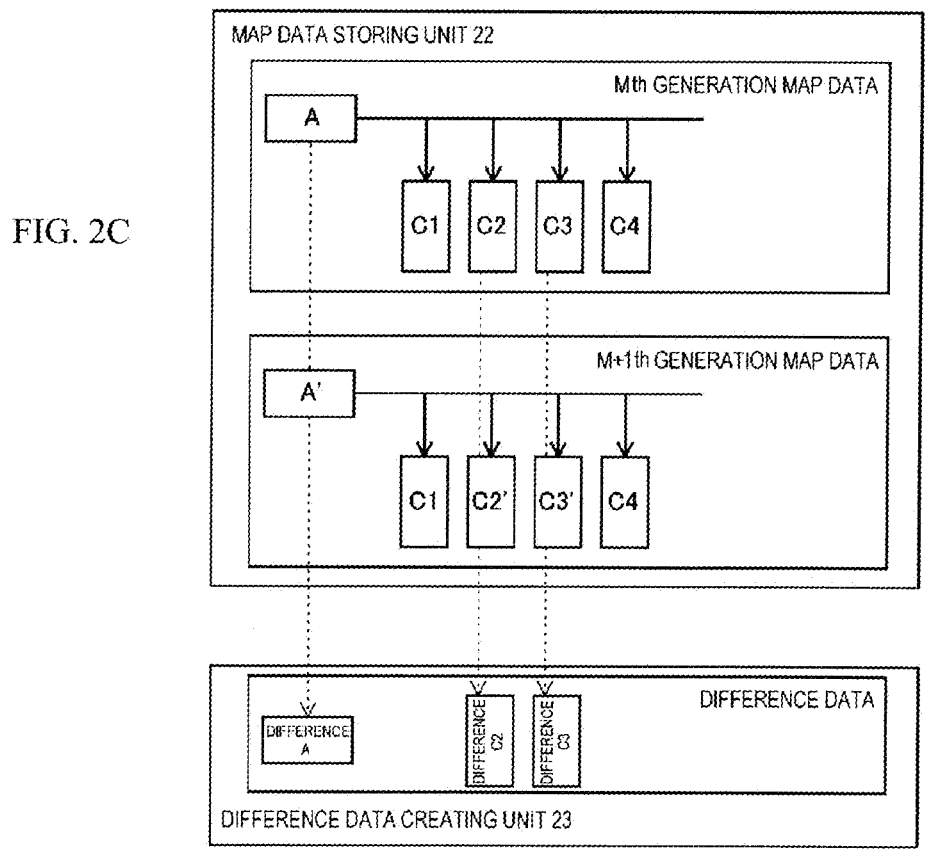
FIG. 2C is a schematic diagram explaining a process executed by a difference data creating unit, in accordance with embodiments of the present invention.

The difference data creating unit 23 references the receiving unit 21 and the server-side map data storing unit 22 to create difference data between map data of a generation corresponding to generation information of the map data in operation in the navigation device 3 and the map data of the newest generation. The difference data may be created using a conventional method, and the method is without particular limitation. For example, as illustrated in FIG. 2C, by comparing respective binary data of the management data A and the updated management data A', the section data C2 and the updated section data C2', and the section data C3 and the updated section data C3' to find differences therebetween, binary difference data can be extracted. The difference data (difference A) corresponding with the management data created by the difference data creating unit 23 and the difference data (differences C2, C3) corresponding with the section data are saved in the saving unit 24. As another example, the difference data creating unit 23 can create difference data in the map data storing unit 22 in association with map data of each generation. In this case, a difference data specifying unit which specifies difference data required for updating map data of a generation in operation in the navigation device 3 to map data of a newest generation may be provided to specify difference data to be distributed to the navigation device 3. The created difference data can be stored in the map data storing unit 22. Furthermore, the created difference data may be stored as compressed data in the map data storing unit 22. In this case, it is possible to specify compressed data necessary for updating instead of the difference data necessary for updating to the latest generation map data.

The distributing unit 25 distributes the difference data created by the difference data creating unit 23 to the navigation device 3. For example, each created difference data can be compressed into a single compressed data and distributed by the distributing unit 25.

The navigation device 3 includes a transmitting/receiving unit 31, a navigation-side map data storing unit 32, and an updating unit 33.

The transmitting/receiving unit 31 functions as a receiving unit for receiving difference data distributed from the server device 2 by the distributing unit 25, and as a transmitting unit for transmitting generation information of map data that is in operation in the navigation device 3.

The navigation-side map data storing unit 32 stores map data similar to that illustrated in FIG. 2A. In the case of updating multiple times, the storing unit 32 stores map data for at least two generations.

The updating unit 33 includes a management data updating unit 34 and a section data updating unit 35. These will now be described with reference to FIG. 3, as appropriate.

The management data updating unit 34 references the transmitting/receiving unit 31 and the map data storing unit 32, updates management data (A) corresponding with received difference data (difference A) to create updated management data (A'), and writes the updated management data (A') to a different area that is different from an area on which the management data before the update is stored (that is, the area of the management data (A)).

The section data updating unit 35 references the transmitting/receiving unit 31 and the map data storing unit 32, updates section data (C2, C3) corresponding with received difference data (differences C2, C3) to create updated section data (C2', C3'), and writes the updated section data (C2', C3') to a different area that is different from an area on which the section data before the update is stored (that is, the area of the section data (C2, C3)).

The navigation device 3 may be provided with an input receiving unit for receiving input of difference data instead of the transmitting/receiving unit 31.

As described above, when writing both of the updated data, because both of the updating units 34, 35 designate different areas which are different from each of the areas on which data before the update is stored, the data (A, C2, C3) before the update corresponding with the updated data (A', C2', C3') also exists within the map data storing unit 32 after the update.

When displaying a map with sections 1 to 4 using updated map data, the updated management data (A') designates section data (C1, C4) corresponding with sections 1, 4 having non-updated section data and also designates updated section data (C2', C3'), which has updated section data for sections 2, 3, as having priority over section data (C2, C3) from before the update. Then, in the case of a malfunction occurring with the updated section data, the management data (A) before the update is activated instead of the updated management data (A'), this update management data (A) before the update does not designate the updated section data (C2', C3') but designates the section data C1 to C4, with which a map corresponding to sections 1 to 4 is displayed. According to the map update system of embodiments of the present invention, because the update section data before the update also remains in the map data storing unit 32 in the navigation device 3, even if a malfunction occurs in the updated data, a map can be continuously displayed by switching to the data before the update.

Figure 4:
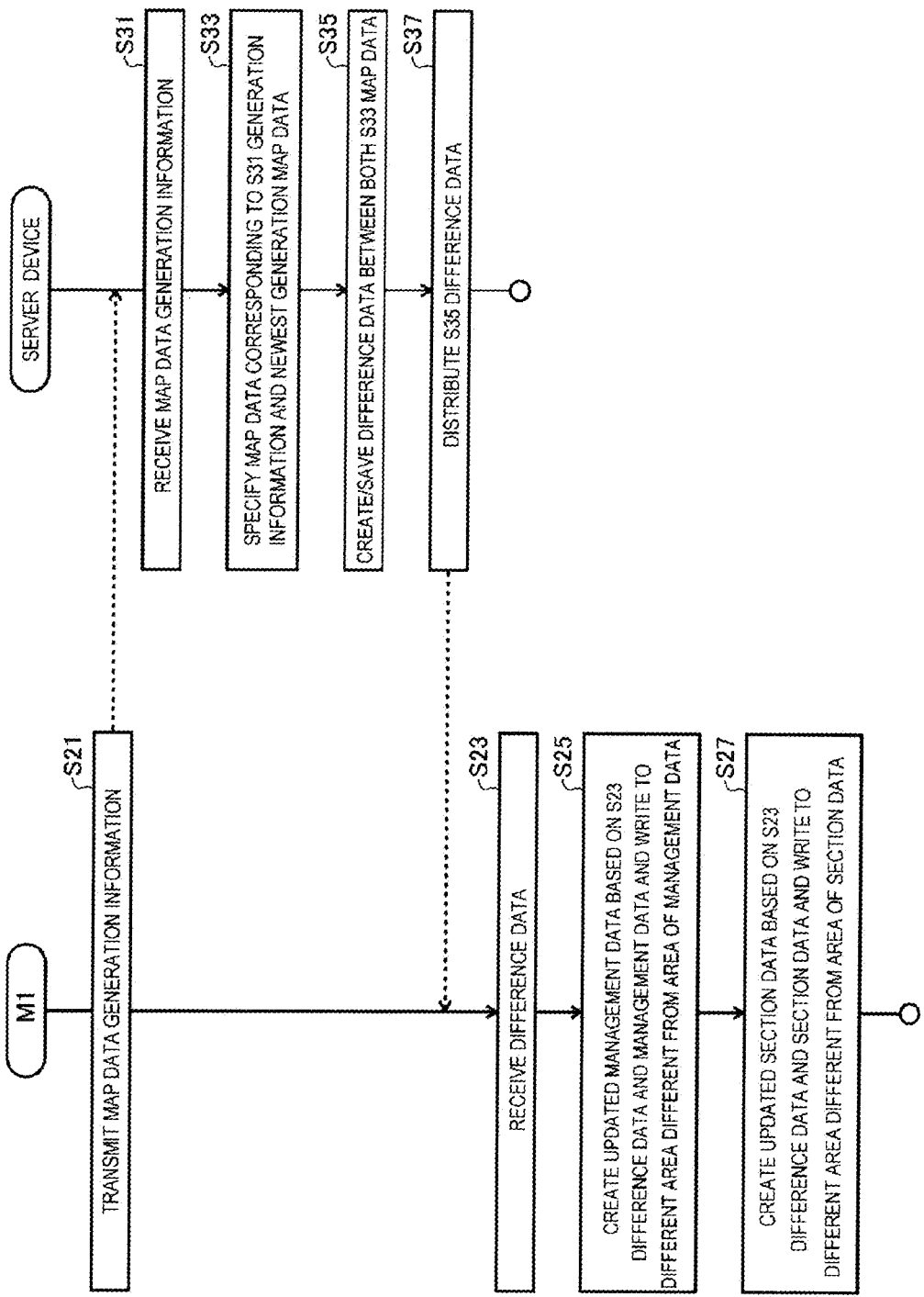
FIG. 4 is a flowchart illustrating an example of operation of a map update, in accordance with embodiments of the present invention.

An example of operation of the map update system 1 illustrated in FIG. 1 will now be described with reference to FIG. 4.

First, in step 21 (S21), the transmitting/receiving unit 31 references the navigation-side map data storing unit 32 and transmits the generation information of the map data currently being referenced by the navigation device 3 to the server device 2. The receiving unit 21 in the server device 2 receives the generation information (step 31 (S31, server device side receiving step)).

In step 33 (S33), as part of a difference data creating step, the difference data creating unit 23 references the server-side map data storing unit 22 and specifies map data of a generation corresponding to the generation information of map data received in step 31 (S31) and map data of a newest generation.

In step 35 (S35), as part of the difference data creating step, the difference data creating unit 23 creates and saves difference data between both of the map data specified in step 33 (S33). As described above, in the case of the difference data associated with the map data of each generation or the compressed data of the difference data being stored in the map data storing unit 22, and in the case of the difference data required for updating the generation of the map data in operation in the navigation device 3 to the latest generation extending over multiple generations, the difference data associated with the map data of each generation or the compressed data may be specified.

In step 37 (S37), as a distributing step, the distributing unit 25 transmits the difference data created in step 35 (S35) to the navigation device 3. Then, the transmitting/receiving unit 31 in the navigation device 3 receives the difference data (step 23 (S23, navigation device side receiving step)).

In step 25 (S25), as a management data updating step, based on management data of map data of step 21 (S21) and a portion of the difference data corresponding to management data from the difference data of step 23 (S23), the management data updating unit 34 within the updating unit 33 creates updated management data and writes the updated management data to a different area that is different from an area on which management data before the update is stored.

In step 27 (S27), as a section data updating step, based on section data of map data of step 21 (S21) and a portion of the difference data corresponding to section data from the difference data of step 23 (S23), the section data updating unit 35 within the updating unit 33 creates updated section data and writes the updated section data to a different area that is different from an area on which section data before the update is stored.

Instead of the step 23 described above, an input receiving step for receiving input of difference data may be provided.

Figure 5:
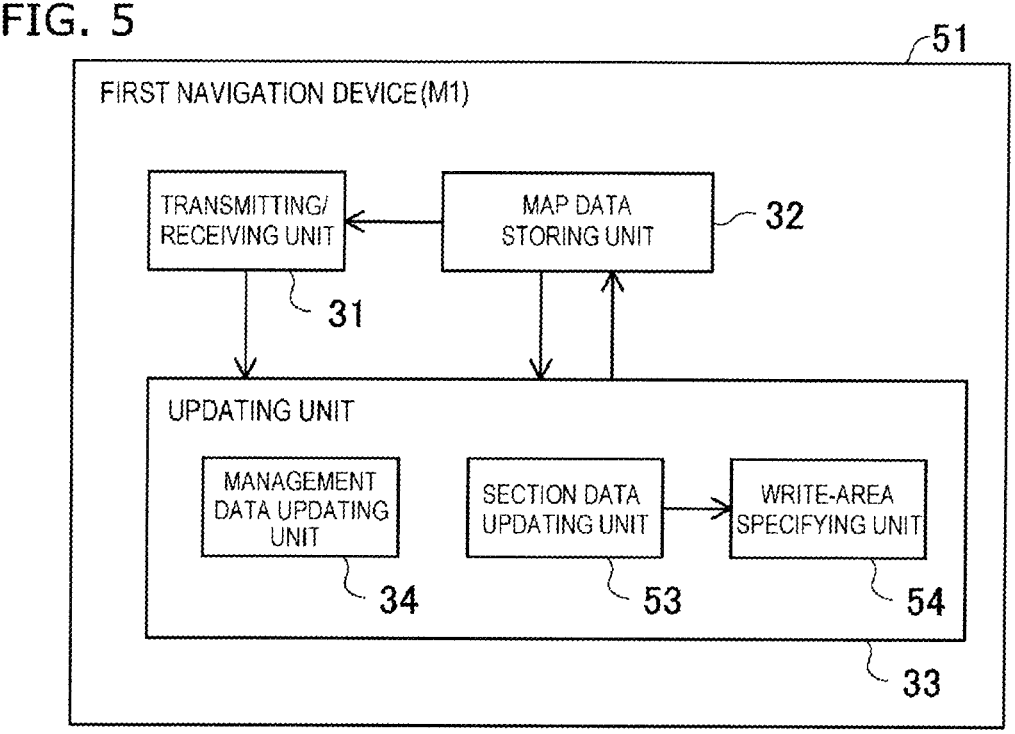
FIG. 5 is a block diagram illustrating a configuration of a navigation device, in accordance with embodiments of the present invention.

FIG. 5 illustrates a navigation device 51 according to another embodiment. In FIG. 5, the same elements as those in FIG. 1 are denoted by the same reference signs, and a description thereof will be partially omitted.

In the navigation device 51 illustrated in FIG. 5, specifying an area for writing the updated section data facilitates writing of updated section data with the section data updating unit. Thus, the device 51, with respect to the navigation device 3 of the system 1 illustrated in FIG. 1, is further provided with a write-area specifying unit 54 and is also provided with a section data updating unit 53 instead of the section data updating unit 35.

The write-area specifying unit 54, based on the updated management data and the management data before the update within the map data storing unit 32, specifies an area within the map data storing unit 32, excluding areas on which section data designated by updated management data and by management data before the update are stored, as a writable area on which updated section data can be written. For example, the write-area specifying unit 54 can assign a flag to a writable area or make a list of writable areas.

Figure 6:
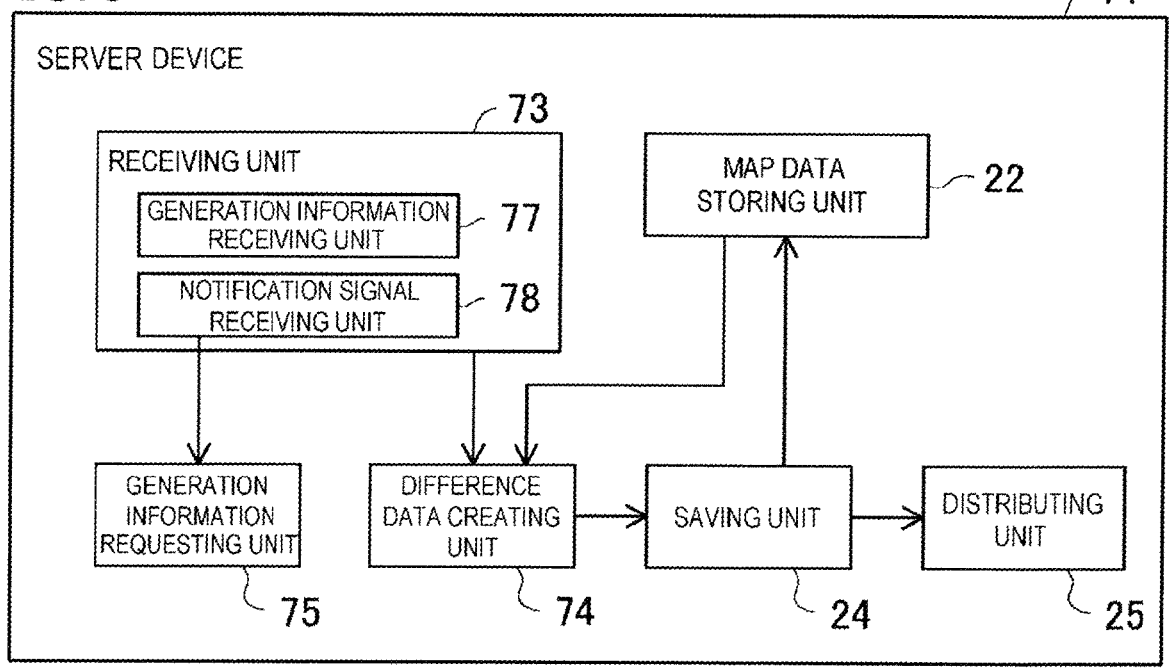
FIG. 6 is a block diagram illustrating a configuration of a server device, in accordance with embodiments of the present invention.

The section data updating unit 53 creates updated section data in the same manner as the section data updating unit 35 and stores the created updated section data in areas specified by the write-area specifying unit 54 in the map data storing unit 32. FIG. 6 illustrates a server device 71 according to another embodiment. In FIG. 6, the same elements as those in FIG. 1 are denoted by the same reference signs, and a description thereof will be partially omitted.

FIG. 6 illustrates a server device which, in the case of receiving a notification signal indicating that map data is not functioning normally in the navigation device, can provide difference data enabling map data of the generation in operation in the navigation device to be updated to a newest generation map data. Thus, the device 71, with respect to the server device 2 of the system illustrated in FIG. 1, is further provided with a generation information requesting unit 75 and is also provided with a server-side receiving unit 73 and a difference data creating unit 74 instead of the server-side receiving unit 21 and the difference data creating unit 23, respectively.

The server-side receiving unit 73 includes a generation information receiving unit 77 and a notification signal receiving unit 78.

The generation information receiving unit 77, as in the receiving unit 21, receives generation information of map data in operation in the navigation device.

The notification signal receiving unit 78 receives a notification signal for indicating that the map data stored in the navigation device is not functioning normally via the transmitting unit of the navigation device. The notification signal is then forwarded to the generation information requesting unit 75.

The generation information requesting unit 75, upon receiving the notification signal, makes a request to the navigation device for generation information of the map data currently being referenced by the navigation device. In this example, the generation information receiving unit 77 receives generation information corresponding to the request.

The difference data creating unit 74, based on the generation information received by the generation information receiving unit 77, creates difference data using the same method as the difference data creating unit 23.

Figure 7:
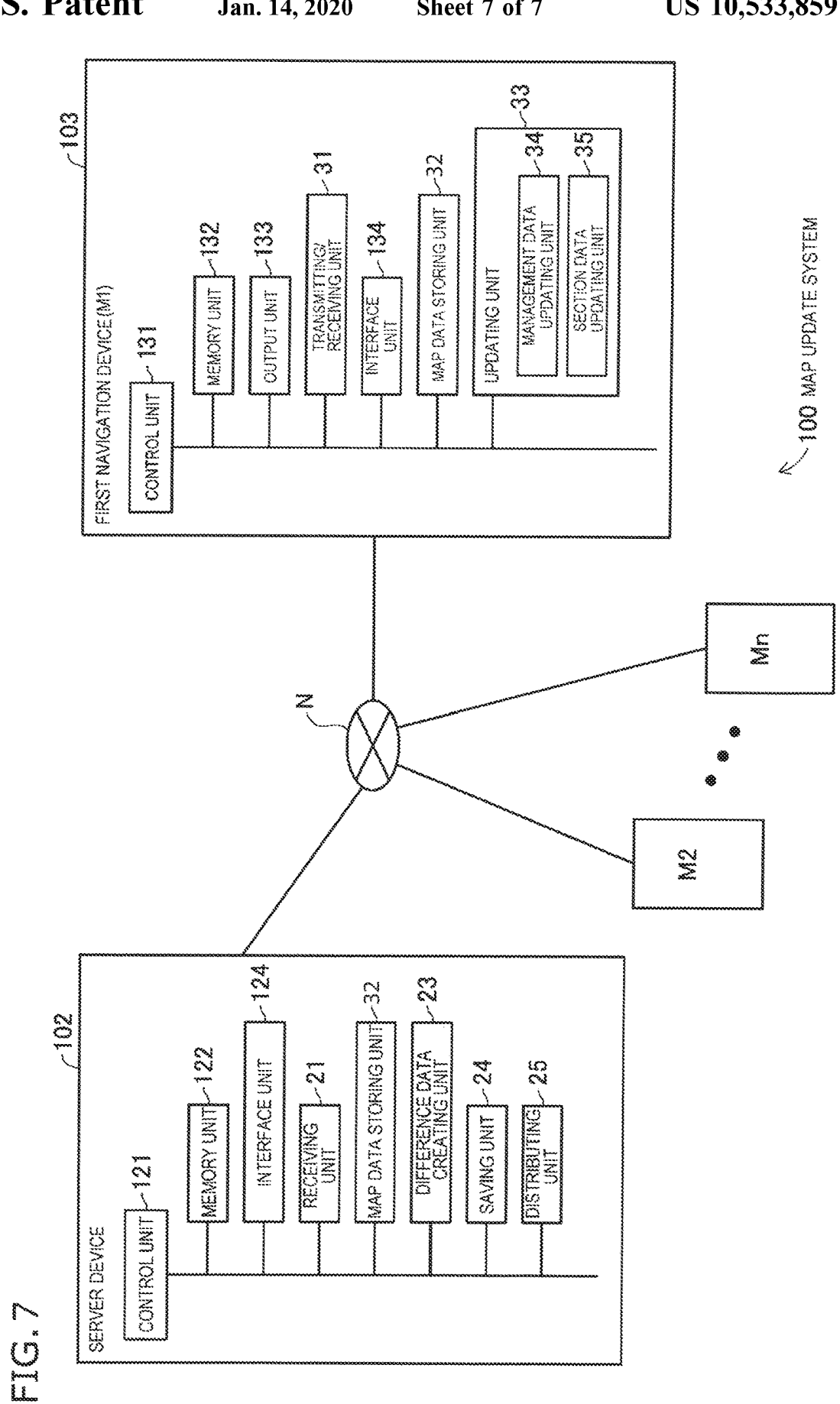
FIG. 7 is a block diagram illustrating a configuration of a map update system, in accordance with embodiments of the present invention.

FIG. 7 illustrates a map update system 100 according to an embodiment of the present invention. In FIG. 7, the same elements as those in FIGS. 1, 5, and 6 are denoted by the same reference signs, and a description thereof will be partially omitted.

Thus, the map update system 100, with respect to the system 1 illustrated in FIG. 1, is provided with a server device 102 and a navigation device 103 instead of the server device 2 and the navigation device 3, respectively.

The server device 102 includes a control unit 121, a memory unit 122, an interface unit 124, a receiving unit 21, a server-side map data storing unit 22, a difference data creating unit 23, a saving unit 24, and a distributing unit 25.

The server-side control unit 121 is a computer device including a CPU and a buffer memory, among other devices, and controls other elements constituting the server device 102.

In the server-side memory unit 122, a computer program is saved, and this computer program is loaded into the server-side control unit 121, which is a computer device, thereby enabling it to function. This computer program can be saved on a general-purpose medium such as a DVD, among others.

The server-side interface unit 124 connects the server device 102 to, for example, a wireless network.

The receiving unit 21, the server-side map data storing unit 22, the difference data creating unit 23, the saving unit 24, and the distributing unit 25 are as described above.

The navigation device 103 includes a control unit 131, a memory unit 132, an output unit 133, an interface unit 134, a transmitting/receiving unit 31, a navigation-side map data storing unit 32, and an updating unit 33.

The terminal-side control unit 131 is a computer device including a CPU and a buffer memory, among other devices, and controls other elements constituting the navigation device 103.

In the terminal-side memory unit 132, a computer program is saved, and this computer program is loaded into the terminal-side control unit 131, which is a computer device, thereby enabling it to function. This computer program can be saved on a general-purpose medium such as an SD (registered trademark) memory card.

The output unit 133 includes a display as a display unit which displays information such as a map based on the map data, among other information. The output unit 133 can also include a voice outputting unit.

The terminal-side interface unit 134 connects the navigation device 103 to, for example, a wireless network.

The transmitting/receiving unit 31, the navigation-side map data storing unit 32, and the updating unit 33 are as described above.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

REFERENCE SIGNS LIST 1, 100 map update system
2, 71, 102 server device
3, 51, 103 navigation device
21, 73 receiving unit
22 server-side map data storing unit
23, 74 difference data creating unit
25 distributing unit
31 transmitting/receiving unit
32 navigation-side map data storing unit
33 updating unit
34 management data updating unit
35, 53 section data updating unit
54 write-area specifying unit

The invention claimed is:

1. A map update system having a server device storing map data for each generation and a navigation device configured to communicate with the server device, the map update system updating map data of the navigation device based on the map data stored by the server device,
   the map data comprising section data and management data, wherein the section data for rendering sections defined by dividing a navigation map and the management data for designating the section data to render the sections of the navigation map,
   the server device comprising:
      a processor that is configured to:
      receive, from the navigation device, generation information of map data which is currently being referenced by the navigation device;
      create difference data of management between the management data of a generation corresponding to the received generation information and the management data of a newest generation and create difference data of section between the section data of the generation corresponding to the received generation information and section data of the newest generation; and
      distribute the created difference data of the management and the difference data of section to the navigation device,
   the navigation device comprising:
      a processor configured to:
      receive the difference data of the management and the difference data of section from the server device;
      create updated management data by updating current management data currently being referenced by the navigation device based on the difference data of management, and write the updated management data to an area that is different from an area on which the current management data is stored; and create updated section data by updating current section data currently being referenced by the navigation device based on the difference data of section, and write the updated section data to an area that is different from an area on which the current section data is stored.

2. A navigation system having a server device storing map data for each generation and a navigation device configured to communicate with the server device, the map date in the navigation device is updated based on map data stored in the server device comprising:

the map data comprises section data and management data, wherein the section data for rendering sections defined by dividing a navigation map and the management data for designating the section data to render the sections of the navigation map, the server device comprising:
a processor configured to:
receive, from the navigation device, generation information of map data which is currently being referenced by the navigation device;
create difference data of management between the management data of a generation corresponding to the received generation information and management data of a newest generation, and create difference data of section between the section data of the generation corresponding to the received generation information and section data of the newest generation, and
distribute the created difference data of management and the difference date of section to the navigation device,
the navigation device comprising:
a processor configured to:
receive the difference data of management and the difference data of section from the server device;
create updated management data by updating current management data currently being referenced by the navigation device based on the difference data of management, and write the updated management data to an area that is different from an area on which the current management data is stored;
create updated section data by updating current section data currently being referenced by the navigation device based on the difference data of section, and write the updated section data to an area that is different from an area on which the current section data is stored; and
display the navigation map based on the updated section data and the current section data designated both by the updated management data, and display the navigation map based on the current section data designated by the current management data, instead of the updated management data, in a case where the updated section data including an error.

3. The navigation system according to claim 2, wherein updated section data is updated n times, on an area on which the section data having been updated n−2 times is stored.

4. The navigation system according to claim 2, wherein writeable area on which the updated section data is writable is specified according to the updated management data and the current management data, wherein the writable area being an area within the map data storing unit, excluding an area having been designated by by the updated management data and by the current management data to store the updated section data and current section data respectively.

5. A navigation method for updating map data, wherein a server device stores map data for each generation and a navigation device is configured to communicate with the server device, the map date in the navigation device is updated based on map data stored in the server device comprising:

the map data comprises section data and management data, wherein the section data for rendering sections defined by dividing a navigation map and the management data for designating the section data to render the sections of the navigation map, the server device comprising:
a processor configured to:
receive, from the navigation device, generation information of map data which is currently being referenced by the navigation device;
create difference data of management between the management data of a generation corresponding to the received generation information and management data of a newest generation, and create difference data of section between the section data of the generation corresponding to the received generation information and section data of the newest generation, and
distribute the created difference data of management and the difference date of section to the navigation device,
the navigation device comprising:
a processor configured to:
receive the difference data of management and the difference data of section from the server device;
create updated management data by updating current management data currently being referenced by the navigation device based on the difference data of management, and write the updated management data to an area that is different from an area on which the current management data is stored;
create updated section data by updating current section data currently being referenced by the navigation device based on the difference data of section, and write the updated section data to an area that is different from an area on which the current section data is stored; and
display the navigation map based on the updated section data and the current section data designated both by the updated management data, and display the navigation map based on the current section data designated by the current management data, instead of the updated management data, in a case where the updated section data, including an error.

6. The navigation method according to claim 5, wherein the section data is updated n times, on an area on which the section data having been updated n−2 times is stored.

7. The navigation method according to claim 5, wherein a writeable area on which the updated section data is writable is specified according to the updated management data and the current management data, wherein the writable area being an area within the map data storing unit, excluding an area having been designated by the updated management data and by the current management data to store the updated section data and current section data respectively.

8. A tangible non-transitory computer-readable storage medium that contains a computer program, including a server device storing map data for each generation and a navigation device configured to communicate with the server device, the map date in the navigation device is updated based on map data stored in the server device comprising:

the map data comprises section data and management data, wherein the section data for rendering sections defined by dividing a navigation map and the management data for designating the section data to render the sections of the navigation map,
the server device comprising:
a processor configured to:
receive, from the navigation device, generation information of map data which is currently being referenced by the navigation device;
create difference data of management between the management data of a generation corresponding to the received generation information and management data of a newest generation, and create difference data of section between the section data of the generation corresponding to the received generation information and section data of the newest generation, and distribute the created difference data of management and the difference date of section to the navigation device, the navigation device comprising:

a processor configured to:

receive the difference data of management and the difference data of section from the server device;

create updated management data by updating current management data currently being referenced by the navigation device based on the difference data of management, and write the updated management data to an area that is different from an area on which the current management data is stored;

create updated section data by updating current section data currently being referenced by the navigation device based on the difference data of section, and write the updated section data to an area that is different from an area on which the current section data is stored; and display the navigation map based on the updated section data and the current section data designated both by the updated management data, and display the navigation map based on the current section data designated by the current management data, instead of the updated management data, in a case where the updated section data including an error.

9. The storage medium according to claim 8, wherein the section data is updated n times, on an area on which the section data having been updated n−2 times is stored.

10. The storage medium according to claim 8, wherein a writeable area on which the updated section data is writable is specified according to the updated management data and the current management data, wherein the writable area being an area within the map data storing unit, excluding an area having been designated by the updated management data and by the current management data to store the updated section data and current section data respectively.

11. A server device for a navigation system, wherein the navigation system having the server device storing map data for each generation and a navigation device configured to communicate with the server device, the map date in the navigation device is updated based on map data stored in the server device, wherein the map data comprises section data and management data, wherein the section data for rendering sections defined by dividing a navigation map and the management data for designating the section data to render the sections of the navigation map, wherein the server device comprising:

a processor configured to:

receive, from the navigation device, generation information of map data which is currently being referenced by the navigation device;

create difference data of management between the management data of a generation corresponding to the received generation information and management data of a newest generation, and create difference data of section between the section data of the generation corresponding to the received generation information and section data of the newest generation, and distribute the created difference data of management and the difference data of section to the navigation device.

12. A navigation device for a navigation system, wherein the navigation system having the server device storing map data for each generation and a navigation device configured to communicate with the server device, the map date in the navigation device is updated based on map data stored in the server device, wherein the map data comprises section data and management data, wherein the section data for rendering sections defined by dividing a navigation map and the management data for designating the section data to render the sections of the navigation map, wherein the server device comprising:

a processor configured to:

receive, from the navigation device, generation information of map data which is currently being referenced by the navigation device;

create difference data of management between the management data of a generation corresponding to the received generation information and management data of a newest generation, and create difference data of section between the section data of the generation corresponding to the received generation information and section data of the newest generation, and distribute the created difference data of management and the difference date of section to the navigation device, wherein the navigation device comprising:

a processor configured to:

receive the difference data of management and the difference data of section from the server device;

create updated management data by updating current management data currently being referenced by the navigation device based on the difference data of management, and write the updated management data to an area that is different from an area on which the current management data is stored;

create updated section data by updating current section data currently being referenced by the navigation device based on the difference data of section, and write the updated section data to an area that is different from an area on which the current section data is stored; and display the navigation map based on the updated section data and the current section data designated both by the updated management data, and display the navigation map based on the current section data designated by the current management data, instead of the updated management data, in a case where the updated section data, including an error.

* * * * *